United States Patent [19]

Fetterman

[11] 4,111,243
[45] Sep. 5, 1978

[54] BEVERAGE DISPENSING DEVICE

[75] Inventor: Charles P. Fetterman, Kirkwood, Mo.

[73] Assignee: Consumers Digital Systems Corp., St. Louis, Mo.

[21] Appl. No.: 699,893

[22] Filed: Jun. 25, 1976

[51] Int. Cl.² .......................... B65B 3/36; B67D 5/08
[52] U.S. Cl. .................................. 141/102; 141/362; 222/70; 251/138
[58] Field of Search ................... 137/624.12; 141/13, 141/84, 94, 96, 102, 104, 105, 128, 360–362; 222/70, 14–16; 251/138; 361/195, 196

[56] References Cited

U.S. PATENT DOCUMENTS

| 1,512,017 | 10/1924 | Field | 141/362 X |
| 3,355,068 | 11/1967 | Harland et al. | 222/70 X |
| 3,718,233 | 2/1973 | Nordoff | 222/70 |
| 4,004,715 | 1/1977 | Williams et al. | 222/70 X |

*Primary Examiner*—Richard E. Aegerter
*Assistant Examiner*—Frederick R. Schmidt
*Attorney, Agent, or Firm*—Polster, Polster and Lucchesi

[57] ABSTRACT

A beer dispenser includes a timer-controlled automatic lever-operating mechanism which is mounted on a beer faucet by means of a quick-disconnect coupling. A lock is provided for preventing unauthorized removal of the lever-operating mechanism. When the lock is released, the device is quickly removed from the faucet for manual operation of the faucet or for cleaning the faucet. A trip lever behind the faucet spout actuates a timing circuit which opens the faucet valve for a preselected period. A manual switch in the device permits addition of a single small portion of beer, to replace head spillage.

12 Claims, 8 Drawing Figures

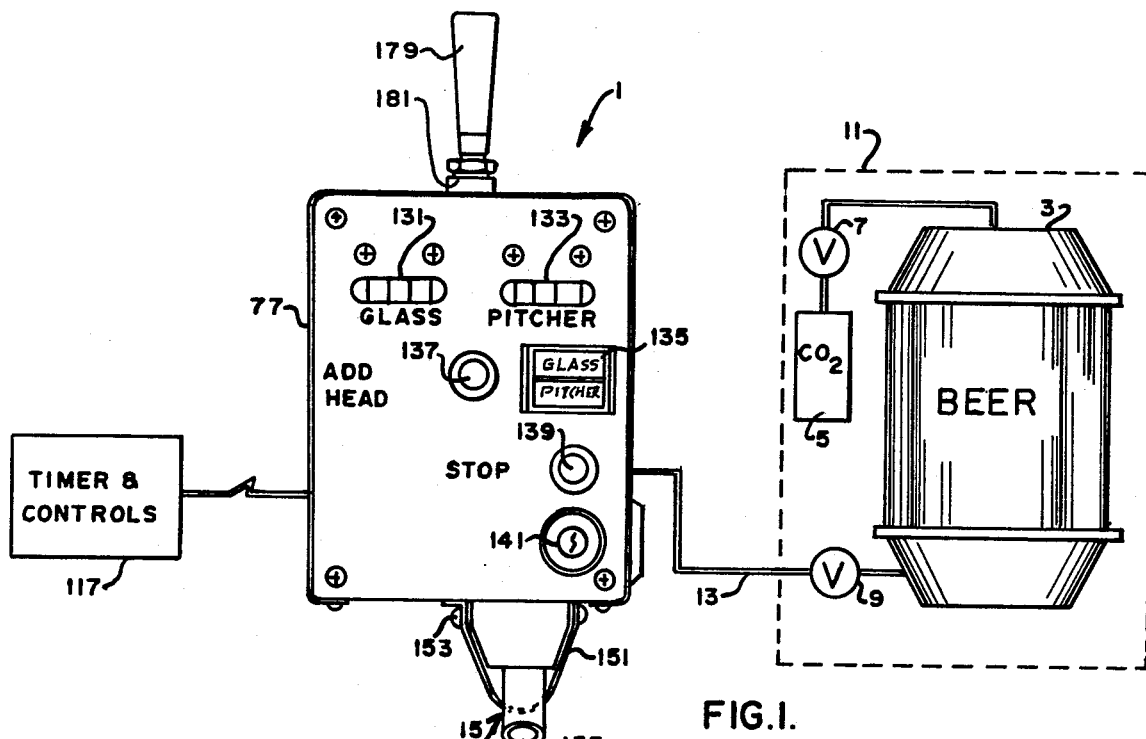
FIG.1.
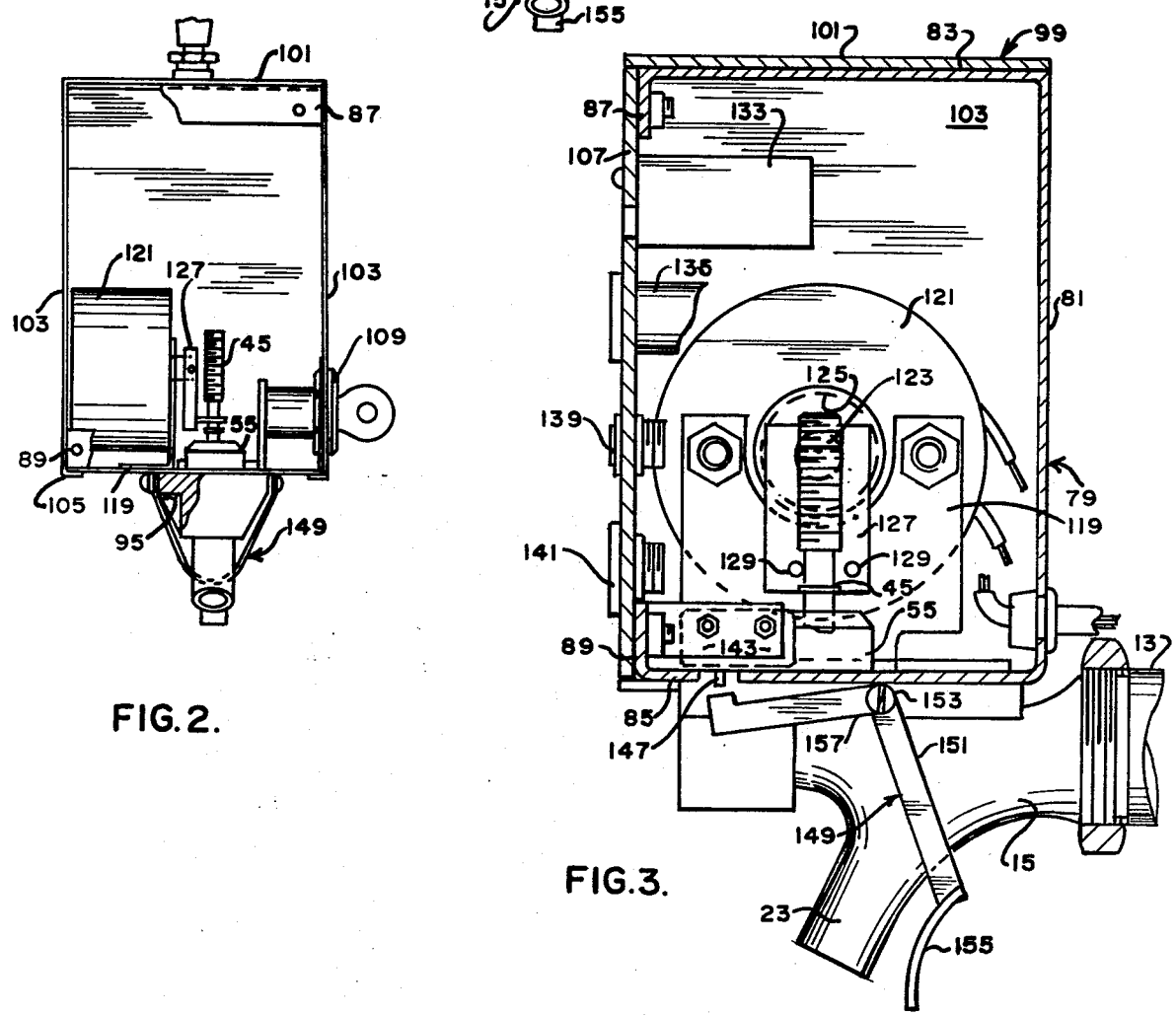
FIG.2.
FIG.3.

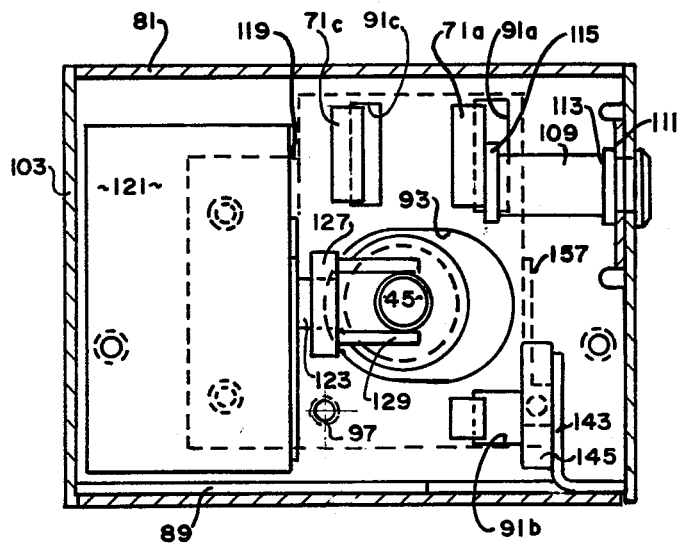
FIG. 4.
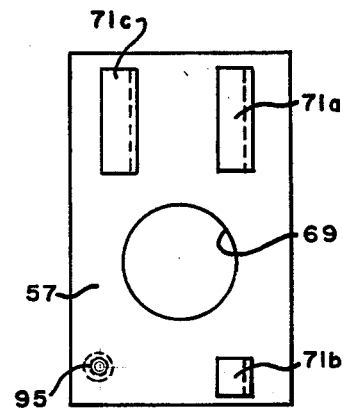
FIG. 5.
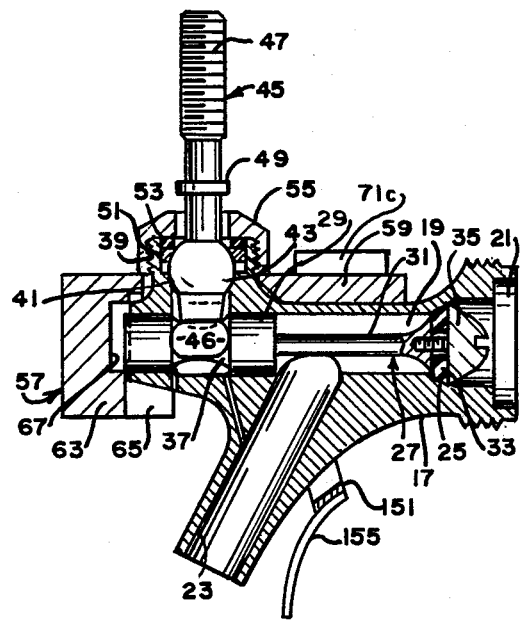
FIG. 6.
FIG. 7.
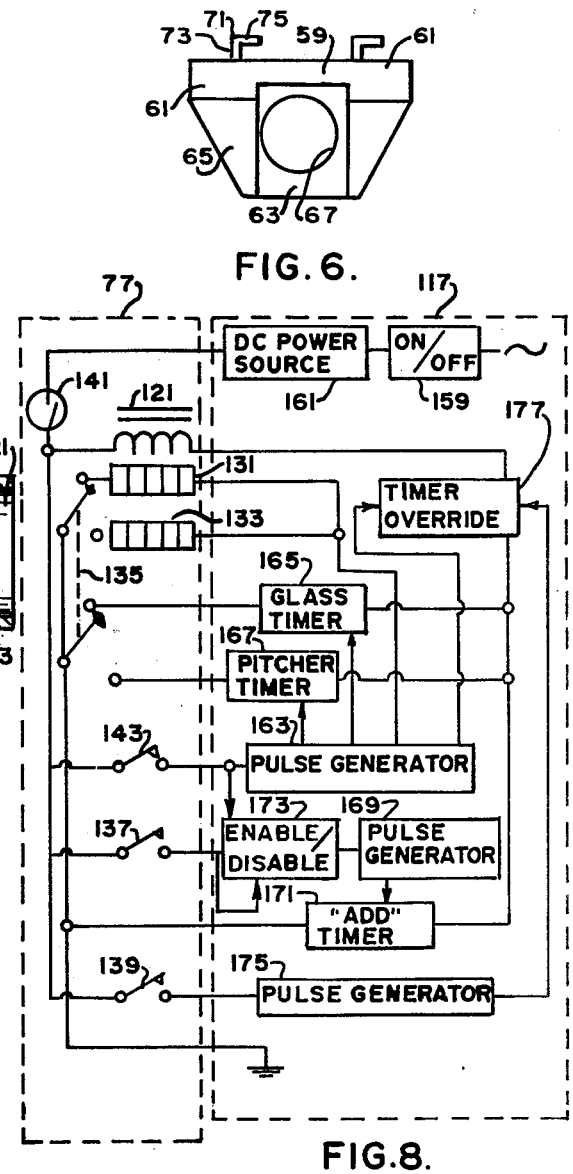
FIG. 8.

BEVERAGE DISPENSING DEVICE

BACKGROUND OF THE INVENTION

This invention relates to beverage dispensing devices, and in particular to a draft beer dispenser.

The occasional lapses of bartenders who spill substantial quantities of beer or neglect to collect for all the beer they have served have led in recent years to increasing use of automatic dispensing devices. These devices dispense a preselected portion of beer and then shut off the flow automatically. Generally, they consist of a specially modified beer faucet including a solenoid which operates a modified valve structure in the faucet and a push-button switch which activates the solenoid. The systems also include an electronics box mounted under the bar. This box includes a timing circuit which controls the length of time the solenoid holds the valve open and a counter which records the number of times a portion of beer is drawn. Because modern beer tapping equipment maintains both temperature and pressure within close tolerances, a timing circuit is adequate to provide reasonably reproducible portion control.

Presently known automatic beer dispensing systems have still not met with a great deal of commercial success. In large part, their lack of success has been due to the fact that the automatic faucet is far more difficult to clean than a manually operated one, and has numerous parts which are easily corroded. Consequently, their failure rate has been high, even over a relatively short lifetime. When the automatic faucet fails, it not only is liable to waste a good deal of beer before the line is shut off, but also renders the faucet useless until a new faucet can be obtained and attached. Thus, not only beer, but sales and customer goodwill are lost. They are also lost whenever a failure in the electrical system of the automatic dispenser prevents it from operating. The systems have also suffered from being rather inconvenient for the bartender, who must use both hands for holding the glass and pressing the button. Despite careful control of temperature and pressure, the amount of beer poured, and in particular the amount of head, varies, and customers sometimes feel slighted by the amount of beer an automatic dispenser gives them.

SUMMARY OF THE INVENTION

One of the objects of this invention is to provide an automatic beer dispensing system which is easy to adapt to existing beer faucets, which is less subject to corrosion than previously known automatic dispensers, and which is easily cleaned.

Another object is to provide such a system which is easily removed from a beer faucet for manual operation of the faucet by an authorized person.

Another object is to provide such a system which is highly resistant to tampering by unauthorized personnel.

Another object is to provide such a system which is easily operated with a touch of the glass or pitcher which is to be filled.

Another object is to provide such a system which permits the addition of a single small amount of unmetered beer to a glass or pitcher without permitting substantial amounts of unmetered beer to be added, either continuously or incrementally.

Other objects will become apparent to those skilled in the art in the light of the following description and accompanying drawings.

In accordance with one aspect of this invention, generally stated, a dispensing device for a pressurized beverage, such as beer, is provided which includes a faucet having a passageway through it, including a valve seat and an outlet spout; a movable valve part cooperable with the valve seat to open and close the passageway; a valve stem extending exteriorly of the body for manual operation and cooperative with the valve part to move the valve part from an open to a closed position; an automatic dispensing means for operating the valve stem to dispense a portion of the beverage; housing means for preventing access to the valve stem; coupling means for mounting the housing means on the faucet; and lock means for preventing unauthorized release of the coupling means. The coupling means preferably comprise a quick release coupling including finger parts on the faucet structure and cooperating slots in the housing means. In accordance with another aspect of the invention, a mounting block is mounted on a faucet structure which may be a standard beer dispensing faucet, and both the means for mounting the mounting block on the faucet and coupling means for coupling the housing means on the mounting block are protected against unauthorized release by the housing means. Preferably, the mounting block is held to the faucet by the usual cap nut which holds the valve stem pivotally in the faucet body. In accordance with another aspect of the invention, the automatic dispensing means include a slip joint connection between an electrically-powered valve-operating part and the valve stem, to permit unobstructed access to the valve stem when the housing means are removed. In accordance with yet another aspect of the invention, the timing circuit for determining the length of time the valve is to be opened is activated by a switch which is activated by an improved trip lever mechanism. The trip lever mechanism includes a portion extending behind the outlet spout and movable by the rim of the container to cause the activating switch to activate the timing circuit. Preferably, the trip lever is movable forwardly toward the spout to trip the activating switch, and the lever is gravity biased to an equilibrium position out of engagement with the activating switch. In accordance with still another aspect of the invention, the timing circuit includes means for dispensing a smaller secondary portion of the beverage in response to activation of a second manual switch, and disabling means in the timing circuit for disabling the secondary portion means after it has been activated and until the primary timing circuit is thereafter activated.

These and other aspects of the invention will be more readily understood in light of the following detailed description of the preferred embodiment of the invention.

BRIEF DESCRIPTION OF THE DRAWINGS

In the drawings,

FIG. 1 is a partially diagrammatic view in front elevation of a beer dispensing system in accordance with the present invention;

FIG. 2 is a view in front elevation, partially broken away, of a dispensing head part of the system of FIG. 1;

FIG. 3 is a view in right side elevation, also partially broken away, of the dispensing head of FIG. 2;

FIG. 4 is a view in top plan, also partially broken away, of the dispensing head of FIGS. 2 and 3;

FIG. 5 is a top plan view of the mounting block portion of the dispensing head of FIGS. 2–4;

FIG. 6 is a view in rear elevation of the mounting block of FIG. 5;

FIG. 7 is a view, corresponding to FIG. 3, in axial section of the mounting block of FIGS. 5 and 6 mounted on a beer faucet part of the dispensing head of FIGS. 2-4; and FIG. 8 is a circuit diagram of the electronic timer control of the dispenser system of FIG. 1.

DESCRIPTION OF THE PREFERRED EMBODIMENT

Referring now to the drawings, FIG. 1 shows a preferred embodiment of beer dispensing system 1 in accordance with the present invention. The dispensing system 1 includes the usual beer keg 3, bottle of pressurized carbon dioxide 5, automatic pressure-regulating valve 7, and shut-off valve 9, all enclosed in a refrigerator cabinet indicated by the dotted line 11. As is well known in the art, the valve 7 provides a relatively uniform pressure within the keg 3, and therefore maintains a relatively uniform flow rate out of the keg 3. The outlet of the keg 3 is connected through tubing 13 to a beer dispensing faucet 15. The faucet 15 may be a standard beer faucet, illustratively a faucet sold by the Perlick Company, Inc., Milwaukee, Wis., as its No. 308X. As is well known in the art and shown particularly in FIG. 7, the faucet includes a body casting 17 having a passageway through it, including a horizontal bore 19 having an inlet 21, an outlet spout 23 communicating with the horizontal bore 19, and a valve seat 25 adjacent the inlet 21. A valve assembly 27 is slidably mounted in the horizontal bore 19. The valve assembly 27 includes a cylindrical fitting part 29 which is snugly slidable in the forward part of the passageway 19, downstream of the spout 23. The valve assembly 27 also includes a connecting rod 31, integral with the fitting part 29, and a washer 33 secured to the rearward end of the rod 31 by a screw 35. The washer 33 forms a fluid-tight fit with the valve seat 25 when the valve assembly 27 is in its forward position, as shown in FIG. 7. The fitting part 29 is centrally relieved to form a thin web 37. At the forward end of the valve body 17, there is provided an externally-threaded vertical riser part 39, which communicates with the forward portion of the horizontal passage 19. A chamfered step 41 in the riser part 39 provides a seat for pivotally supporting a spherical pivot part 43 of a valve stem 45. At the lower end of the valve stem 45, a split spherical part 46 straddles the web 37 and engages the inner faces of the fitting part 29 of the valve assembly 27. The upper end of the valve stem 45 is threaded as shown at 47 to accept a knob, now shown in FIG. 7. An integral collar 49 on the valve stem 45 acts as a stop for the knob. The valve stem shown in FIG. 7 differs from the stems commonly used in previous commercial beer faucets in that a portion of the threads above the collar 49 is machined away. The spherical pivot part 43 of the valve stem 45 is held against the seat 41 by a friction ring 51, a washer 53 and a cap nut or bonnet 55.

As is also well known in the art, the cap nut 55 is screwed down sufficiently tight that the valve stem 45 can be pulled forward easily to open the valve and dispense beer, and the valve can yet remain in its open position until the valve stem is manually pushed back.

As is also well known in the art, the faucet 15 is easily removed and cleaned, by removing the cap nut 55 and pulling the valve stem 45. Because the front of the faucet body 17 is open, the valve assembly 27 is easily pushed out through the inlet 21 of the body 17.

Mounted to the top of the faucet 15 is a mounting block 57, in the form of an aluminum alloy casting. The mounting block 57 includes an upper wall 59 which rests on the generally flat upper surface of the faucet 15, a pair of side walls 61 which straddle the sides of the faucet 15, a front wall 63, and a pair of downwardly extending wings 65 adjacent the front wall. The front wall 63 and wings 65 prevent the valve part 27 from being opened by unauthorized pushing of its fitting part 29 through the open front end of the valve body 17. A recess 67 in the front wall 63 assures that the front wall 63 does not interfere with the normal forward movement of the valve part 27. A circular hole 69 is provided in the upper wall 59 to permit the externally threaded riser portion 39 to pass through it. The hole 69 is of smaller diameter than the cap nut 55. Therefore, the mounting block is easily secured to the faucet body 17 by removing the cap nut 55, putting the mounting block in place, and replacing the cap nut 55. The mounting block 57 and faucet 15 are so proportioned that as the cap nut is tightened for proper operation of the valve stem 45, it also holds the mounting block 57 snugly in place. As will become apparent hereinafter, it is not essential that the mounting block be held tightly to the faucet for proper operation of the beer dispensing device of the present invention.

Three ears 71a, 71b and 71c are provided on the flat upper face of the upper wall 59 of the mounting block 57. Each ear 71 has a vertical riser part 73 and a horizontal flap part 75 spaced from the top face of the upper wall 59 by about 0.090 inch, to accomodate the thickness of a lower wall of a sheet metal housing 77.

The sheet metal housing 77 includes a C-shaped aluminum frame part 79 having a vertical rear wall 81, an upper wall 83, a lower wall 85, an upper forward flange 87 and a lower forward flange 89. The lower wall 85 includes three rectangular slots 91a, 91b and 91c, each slightly larger than the upper flap parts 75 of the corresponding ears 71a, 71b and 71c. The slot 91b extends considerably farther to the right, as viewed in FIG. 4, than is necessary to accomodate the ear 71b, for purposes described hereinafter. A central opening 93 in the lower wall 85 is somewhat deeper (front-to-back) than the diameter of the cap screw 55 and is considerably wider than the diameter of the cap screw 55. It will be seen that the housing 77 can be mounted on the mounting block 57 by aligning the openings 91 with the ears 71 of the mounting block, and shifting the housing about one-quarter inch to the right, as viewed in FIG. 4. A captive screw 95 in the mounting block 57, may, if desired, be screwed into a threaded opening 97 in the lower wall 85 of the housing 77.

The housing 77 further includes an inverted U-shaped sheet metal part 99 having an upper wall 101, a pair of side walls 103, and a pair of in-turned flaps 105, held by screws to the lower wall 85 of the C-shaped housing part 79.

The housing 77 also includes a front panel 107 held by screws to the forward flanges 87 and 89 of the C-shaped housing part 79.

A key-operated cam lock 109 is mounted through the right side wall 103 of the inverted U-shaped housing piece 99 and an up-turned flap 111 of the lower wall 85 of the C-shaped housing piece 79, by a nut 113. The lock 109 includes a cam part 115 which engages the ear 71a of the mounting block when the lock 109 is turned to its located position. Therefore, in its locked position, the lock 109 prevents the housing 77 from being shifted to the left, and therefore, prevents its removal from the mounting block 57.

Mounted on and within the housing 77 are all the parts of an automatic beer dispensing system required for remote operation of the beer dispensing valve, except certain electronic circuitry housed in a control box 117, described hereinafter. A bracket 119, held by screws to the lower wall 85 of the C-shaped housing part 79, carries a rotary solenoid 121. The rotary solenoid 121 may be of standard manufacture, such as a device sold by Oak Industries as its Model No. 65. When energized, the solenoid 121 rotates its shaft 123 clockwise as viewed in FIG. 3, and when de-energized, a spring 125 rotates the shaft 123 counterclockwise to its original position. An actuator plate 127 is pinned to the shaft 123 and rotates with it. A pair of pins 129, extending parallel to the shaft 123, and thus generally perpendicular to the direction of motion of the actuator plate 127, are carried by the actuator plate 127 and straddle the valve stem 45 of the beer faucet 15. Therefore, when the solenoid 121 is energized, the rearward pin 129 pushes the valve stem 45 forward and opens the valve 27; when it is de-energized the forward pin 129 moves the valve stem 45 back and closes the valve 27.

It will be appreciated that when the housing 77 is placed on the mounting block 57 the valve stem 45 must be in its upright, closed position. The pins 129 clear the valve stem 45 most easily if the housing 77 is tilted somewhat to the left as it is placed on the mounting block 57. The rounded stem above the collar 49 ensures that the pins 129 slip easily over the valve stem 45.

The housing 77 also carries a number of devices associated with the circuitry for the solenoid 121. On the front panel 107 are mounted a pair of electrically actuated counters: a "glass" counter 131 and a "pitcher" counter 133; an illuminated double-pole, double-throw pushbutton switch 135 having two alternatively illuminated panels, labeled "glass" and "pitcher", for indicating the position of the electrical switch; a single-pole, momentary action pushbutton switch 137 labeled "add head"; a single-pole, momentary action pushbutton switch 139 labeled "stop"; and a key-operated, single-pole, momentary action switch 141. An in-turned bracket 143, bent from the lower forward flange 89 of the C-shaped part 79, carries a single-pole single-throw microswitch 145, the actuator 147 of which extends through the right-hand portion of the opening 91b in the lower wall 85 of the C-shaped part 79.

A trip lever assembly 149 is mounted to the mounting block 57 for actuating the microswitch 145. The trip lever assembly 149 includes a yoke part 151, which is pivotally connected to the mounting block 57 by screws 153 and which embraces the lower surface of the spout 23. A finger 155 is secured to the yoke 151 and extends down behind and below the open end of the spout 23. A forwardly-extending arm 157 is secured to the right-hand upright of the yoke part 151 at its upper end. The free forward end of the arm 157 is turned to present a broad bearing surface for the microswitch actuator 147. When a container such as a glass or pitcher is moved closely under the spout 23 and pulled forward, its rim catches the trip lever finger 155 and causes the arm 157 to engage and actuate the microswitch 145. When the finger 155 is released, the trip lever assembly rotates by gravity back to the position shown in FIGS. 3 and 7.

The remainder of the automatic beer dispensing circuitry is housed in the control box 117.

The control circuitry is shown schematically in FIG. 8. It includes an on/off switch 159 and a DC power source 161 for powering the remainder of the system through the key switch 141. It also includes a first one-shot pulse generator 163; a first ("glass") digital timer circuit 165 and a second ("pitcher") digital timer circuit 167, both activated by the first pulse generator 163; a second one-shot pulse generator 169 and a third ("add") digital timer circuit 171 activated by the second pulse generator 169; an enable/disable circuit (electronic single-pole alternate action switch) 173 controlling the second pulse generator 169; a third one-shot pulse generator 175, and a timer override circuit 177 alternatively controlled by the third pulse generator 175 to break a circuit through it and by the first pulse generator 163 to complete the circuit through it. The switch 135, in its first position, shown in FIG. 8, connects the first ("glass") counter 131 in a series circuit with the first pulse generator 163 and connects the first ("glass") timer circuit 165 in a series circuit with the solenoid 121 to activate the solenoid while the timer 165 is running. In its second position, it connects the second ("pitcher") counter 133 and the first pulse generator 163 in a series circuit, and connects the second ("pitcher") timer circuit 167 in a series circuit with the solenoid 121. The microswitch 145 is connected to activate the first pulse generator 163. It is also connected to cause the enable/disable circuit 173 to assume a first stable condition, in which it completes a circuit between the second pulse generator 169 and the "add head" switch 137. The "add head" switch 137 is connected to cause the enable/disable circuit to assume a second stable position in which it breaks the circuit between the switch 137 and second pulse generator 169, as soon as the second pulse generator 169 has been activated. The "add" timer circuit 171 is connected in series with the solenoid 121. The third pulse generator 175 is connected to be activated by the "stop" switch 139, to open the timer override circuit 177, thereby deactivating the solenoid 121 until the override circuit 177 is returned to its closed condition by activation of the first pulse generator 163.

With power supplied to the system through DC power source 161, with the key switch 141 closed, and with portion select switch 135 in its "glass" position as shown in FIG. 8, when the trip lever 149 is moved forward by the rim of a glass and closes the microswitch 145, the first pulse generator 163 generates a signal which simultaneously adds one count to the "glass" register 131 and starts a timing period during which the first timer circuit 165 activates the solenoid 121 to open the valve 27 for a precisely predetermined period. At the end of the period, the solenoid is deactivated and the spring 125 on the solenoid returns the valve 27 to its closed position.

Should the amount of beer in the glass be not quite sufficient, either because of inadequate flow or because of excessive foaming, the "add head" button 137 may be depressed. Depression of the "add head" button 137 activates the "add" timer 171, to add a small fraction of the amount of beer poured by the first timer circuit 165, and simultaneously causes the enable/disable circuit 173 to prevent addition of more unmetered beer.

If the amount of beer poured should prove excessive, for instance if the portion select switch 135 should accidentally be set at the "pitcher" position, depressing "stop" button 137 disconnects the solenoid 121 and prevents its reactivation until another glass or pitcher of beer is poured by activating microswitch 145, thereby sending a control pulse to close the timer override circuit 177.

Depressing portion select button 135 changes the position of the switch 135; when microswitch 145 is activated, the system dispenses a "pitcher" serving under the control of the "pitcher" timer circuit, and causes the second register 133 to increase its count by one.

The time set on each of the three digital electronic timer circuits is easily altered by means of thumbwheels, to meet the requirement dictated by glass and pitcher size, temperature of the beer, pressure maintained by valve 7, and the like. Typically, the amount of beer poured could be 10 ounces per glass, 60 ounces per pitcher, and ½ ounce per added head.

Should the automatic dispensing system fail for any reason, including a power outage, the system is easily converted to manual operation by unlocking the cam lock 109, loosening the screw 95 if it has been screwed into the housing 77, sliding the housing 77 to the left, and lifting it off of the mounting block 57. A knob 179 mounted on a stud 181 at the top of housing 77 may be screwed onto the valve stem 45, if desired, to make operation of the faucet precisely the same as a standard manual system. It will be seen that the mounting block 57 does not interfere in any way with manual operation of the faucet.

The system is disassembled for cleaning the faucet in identically the manner just described. When the faucet has been removed from its piping 13, removal of the cap nut 55 and the valve stem 45 permits the valve assembly 27 to be removed for cleaning. If access to the front of the faucet body 17 is required to push the valve assembly 27 out, removal of the two screws 153 removes the trip lever assembly 149 and permits the mounting block 57 to be lifted off the faucet body 17.

Numerous variations in the dispensing device of the present invention, within the scope of the appended claims, will occur to those skilled in the art in light of the foregoing description, Merely by way of example, although the mounting block of the present invention permits the use of a substantially standard beer faucet in an automatic dispensing system, many of the advantages of the system would be retained by making quick-disconnect fittings as part of the faucet body itself. Different valving systems could also be utilized. Likewise, many of the mechanical features of the present system are usable with different control systems, and many of the features of the control system are usable with different mechanical arrangements. These variations are merely illustrative.

I claim:

1. An easily disassembled and cleaned dispensing device for automatically dispensing a pressurized beverage, said device comprising:
   (a) a faucet body having a passageway therethrough, said passageway including a generally horizontal bore having an inlet, an inlet, an outlet spout communicating with said inlet and a valve seat in said horizontal bore between said inlet and said outlet spout;
   (b) a valve assembly slidably mounted in said horizontal bore, said valve assembly including means cooperative with said valve seat for closing said passageway when said valve assembly is in a forward position;
   (c) a generally vertical bore in said body communicating with said generally horizontal bore, said generally vertical bore including means forming a valve stem seat;
   (d) a valve stem in said generally vertical bore, said valve stem including
      (i) a lower part cooperative with said valve assembly to move said valve assembly from said forward position to a rearward position in which said passageway is open;
      (ii) a central part pivotably mounted in said valve stem seat; and
      (iii) an upper part extending above said faucet body;
   (e) cap nut means mounted on said faucet body for holding and valve stem in said in said generally vertical bore;
   (f) electrically operable means cooperative with said upper part of said valve stem for opening said passageway in said faucet body;
   (g) housing means for carrying said electrically operable means, said housing means comprising a lower wall having slots therein; and
   (h) coupling means on said faucet body for releasably mounting said housing means on said faucet body with said electrically operable means positioned to cooperate with said upper part of said valve stem, said coupling means being so proportioned and constructed as to permit removal of said cap nut means and removal of said valve stem from said generally vertical bore in said faucet body when said housing means are released and removed from said mounting means, said coupling means comprising a plurality of ears, each ear comprising a vertical riser part and a horizontal flap part, said ears extending through said slots in said lower wall of said housing means with said flap parts overlying said lower wall when said housing means are mounted on said faucet body, said ears and said slots forming a quick-disconnect coupling releasable by lateral movement of said housing means with respect to said faucet body.

2. The device of claim 1 wherein said coupling means further comprise a mounting block held to said body by said cap nut means, said cap nut means being located within said housing means when said housing means are mounted on said faucet body, and further including lock means for preventing unauthorized release of said quick-disconnect coupling.

3. The device of claim 2 wherein said lock means comprise key-operated means for preventing lateral movement of said housing means.

4. The device of claim 2 wherein said horizontal bore extends through the front of said faucet body whereby said valve assembly is accessible through the front of said faucet body, and wherein said device further includes means carried by one of said mounting block and said housing means for preventing access to said valve assembly through the front of said faucet body.

5. The device of claim 1 further including timing means for controlling the length of time said electrically operated means operate said valve stem to open said passageway in said faucet body, said timing means comprising first timing circuit means for dispensing a first portion of said beverage, counter means for counting the number of said first portions dispensed, second timing circuit means for dispensing a second portion of said beverage, said second portion being substantially smaller than said first portion, and disabling circuit means for preventing said second circuit from being activated more than once after each activation of said first circuit.

6. The device of claim 1 wherein said electrically operable means comprise a rotary solenoid positioned laterally of said upper part of said valve stem, said rotary solenoid carrying means embracing said upper part of said valve stem for moving said valve stem from a position opening said passageway to a position closing said passageway, said rotary solenoid being spring biased to a position causing the passageway to be closed.

7. The device of claim 6 wherein said rotary solenoid is moved away from said valve stem by said lateral movement of said housing.

8. The device of claim 1 wherein said housing carries an auxiliary handle and wherein said upper part of said valve stem is threaded to accept said handle.

9. A device for automatically dispensing a pressurized beverage, said device comprising: a structure including a passageway for said beverage; means normally closing said passageway; a solenoid for opening said passageway and digital timing means for operating said solenoid to dispense a predetermined portion of said beverage, said digital timing means comprising first digital timing circuit means for operating said solenoid to dispense a first portion of said beverage, counter means for counting the number of said first portions dispensed, second digital timing circuit means for operating said solenoid to dispense a second portion of said beverage, said second portion being substantially smaller than said first portion, and disabling circuit means responsive to operation of said first digital timing circuit means for permitting operation of said second digital timing circuit and responsive to operation of said second digital circuit means for preventing said second digital timing circuit means from being reactivated.

10. An easily disassembled and cleaned dispensing device for automatically dispensing a pressurized beverage, said device comprising:
(a) a faucet body having a passageway therethrough, said passageway including a generally horizontal bore having an inlet, an outlet spout communicating with said inlet and a valve seat in said horizontal bore between said inlet and said outlet spout;
(b) a valve assembly slidably mounted in said horizontal bore, said valve assembly including means cooperative with said valve seat for closing said passageway when said valve assembly is in a forward position;
(c) an externally threaded riser portion on said faucet body;
(d) a generally vertical bore in said body extending through said riser portion on said faucet body and communicating with said generally horizontal bore, said generally vertical bore including means forming a valve stem seat;
(e) a valve stem in said generally vertical bore, said valve stem including
  (i) a lower part cooperative with said valve assembly to move said valve assembly from said forward position to a rearward position in which said passageway is open;
  (ii) a central part pivotably mounted in said valve stem seat; and
  (iii) an upper part extending above said faucet body;
(f) cap nut means mounted on said faucet body threaded riser portion for holding said valve stem in said generally vertical bore;
(g) electrically operable means cooperative with said upper part of said valve stem for opening said passageway in said faucet body;
(h) housing means for carrying said electrically operable means; and
(i) a mounting block including an opening therethrough, said externally threaded riser portion on said faucet body extending through said opening, said mounting block being held to said faucet body by said cap nut means, said mounting block comprising mounting means for releasably mounting said housing means on said faucet body with said electrically operable means positioned to cooperate with said upper part of said valve stem, said cap nut means being located within said housing means when said housing means are mounded on said mounting block.

11. The device of claim 10 further including timing means for controlling the length of time said electrically operated means operate said valve stem to open said passageway in said faucet body and wherein said electrically operable means carried by said housing means comprise switch means for activating said timing means, said mounting block carrying switch engagement means, said switch engagement means comprising a container-engaging portion extending behind said outlet spout, a generally vertical yoke part embracing said spout and carrying said container-engaging portion, a generally horizontal forwardly extending arm adapted to engage said switch means, and pivot means between said yoke part and said arm for pivotally mounting said switch engagement means to said mounting block, said engagement means being gravity biased out of engagement with said switch means and said container engaging portion being forwardly movable by the rim of a container to cause said arm to engage said switch means.

12. The device of claim 10 wherein said mounting means comprise means disengageable by lateral movement of said housing means with respect to said faucet body, and further including lock means for preventing said lateral movement.

* * * * *

UNITED STATES PATENT AND TRADEMARK OFFICE
CERTIFICATE OF CORRECTION

PATENT NO. : 4,111,243
DATED : September 5, 1978
INVENTOR(S) : Charles P. Fetterman It is certified that error appears in the above—identified patent and that said Letters Patent are hereby corrected as shown below:

Column 7, line 60 after "having an inlet," delete "an inlet,"

Column 8, line 16 after "holding" delete "and" and insert

--- said ---

Column 10, line 31 after "are" delete "mounded" and insert

--- mounted ---

Signed and Sealed this

Eighth Day of May 1979

[SEAL]

Attest:

RUTH C. MASON
*Attesting Officer*

DONALD W. BANNER
*Commissioner of Patents and Trademarks*